(No Model.)   2 Sheets—Sheet 1.
F. W. TUCKER.
MACHINE FOR MAKING TOE CALKS.
No. 326,463.   Patented Sept. 15, 1885.
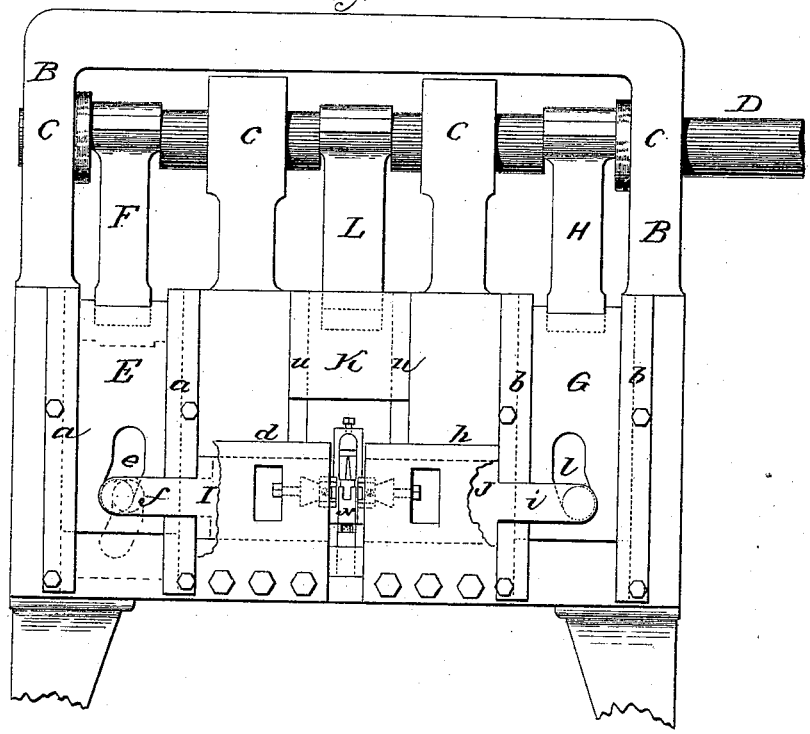
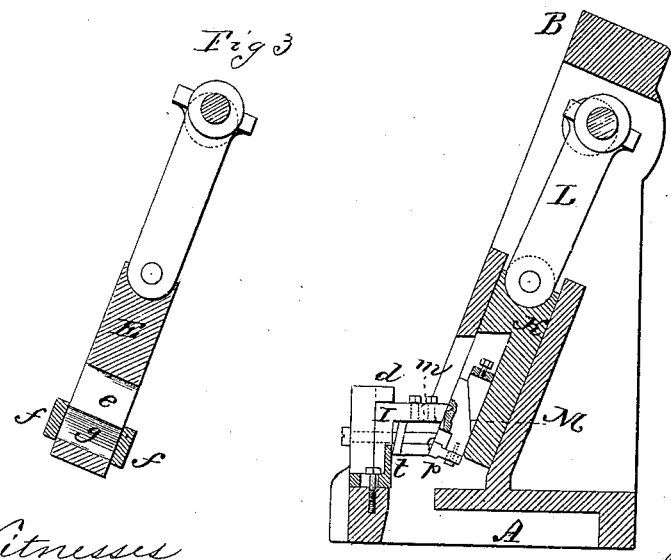
Witnesses
J. H. Shumway
Jos. C. Earl
Frank W. Tucker
By Atty   Inventor
Wm. C. Earl

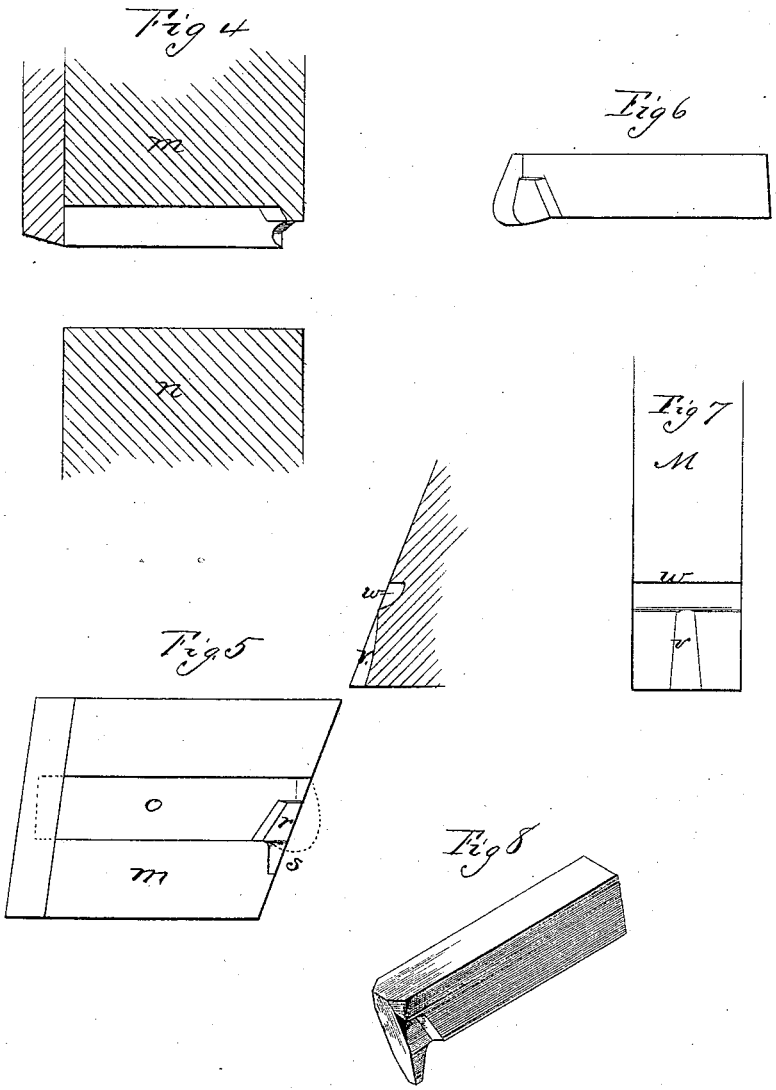

UNITED STATES PATENT OFFICE.

FRANK W. TUCKER, OF WATERBURY, CONNECTICUT.

MACHINE FOR MAKING TOE-CALKS.

SPECIFICATION forming part of Letters Patent No. 326,463, dated September 15, 1885.

Application filed September 15, 1884. (No model.)

*To all whom it may concern:*

Be it known that I, FRANK W. TUCKER, of Waterbury, in the county of New Haven and State of Connecticut, have invented a new Improvement in Machines for Making Toe-Calks; and I do hereby declare the following, when taken in connection with accompanying drawings and the letters of reference marked thereon, to be a full, clear, and exact description of the same, and which said drawings constitute part of this specification, and represent, in—

Figure 1, a front view of the machine; Fig. 2, a vertical central section; Fig. 3, a vertical section through the slide E, showing the connection between it and the slide I; Fig. 4, a horizontal section through the dies $m\ n$ in their respective slides; Fig. 5, a vertical central section between the dies $m\ n$; Fig. 6, the blank as formed by the closing of the dies $m\ n$; Fig. 7, a face view of the die M; Fig. 8, a perspective view of the calk complete.

This invention relates to an improvement in machines for making blanks for toe-calks for horseshoes, such as are produced as an article of manufacture and sold to horseshoers to be applied to shoes. These calks are constructed with a spur at one end, by which the calk may be temporarily attached to the shoe preparatory to heating and welding, the object of the invention being to construct a machine which will successively cut the blanks from the rod and form the spur, and without waste of metal; and the invention consists in the construction of the machine and combination of parts, as more fully hereinafter described, and particularly recited in the claims.

A represents the bed of the machine upon which the operative mechanism is arranged. Upon this bed is an upright frame, B, inclined from the front backward, as seen in Fig. 2. Near the top of the frame, in suitable bearings, C, the driving-shaft D is arranged horizontally, and to this shaft power is applied by any of the usual means for applying power to driving-shafts of similar machinery. At one side of the center a slide, E, is arranged in guides $a$ upon the inclination of the frame. An up-and-down reciprocating movement is imparted to the slide from an eccentric on the driving-shaft, connected to the slide by a pitman, F.

Upon the opposite side of the center is a second slide, G, in the same plane with the slide E, working up and down in guides $b$, and operated from the driving-shaft by an eccentric thereon, connected to the slide G by a pitman, H, the two slides E and G moving up and down simultaneously under the revolution of the driving-shaft.

I is a horizontal slide arranged in guides $d$, and to which slide a reciprocating movement is imparted from the vertically-reciprocating slide E by means of a slot, $e$, in the said slide. From the slide I an arm, $f$, extends over the slide E. In this arm is a stud, $g$, extending through the slot $e$, and to give great strength a like arm, $f$, is arranged upon the back side, as seen in Fig. 3, the stud $g$ connecting the two arms through the slot $e$. The slot $e$ is of cam shape, its lower portion inclined, and its upper portion vertical, and so that starting from its highest point, as seen in Fig. 1, the slide E moves downward and first imparts a horizontal advancing movement to the slide I through the inclined part of the slot $e$, and then the vertical portion of the slot permits the slide to stand in its advanced position, and as seen in broken lines, Fig. 1. On the return of the slide E the last part of its upward movement withdraws the slide I. Upon the opposite side a slide, J, is arranged in the same plane as the slide I, and in like guides, $h$. The slide is provided with arms $i$, like the arms $f$ of the slide I, and the slide G is constructed with a slot, $l$, like the slot $e$ of the slide E, and so that as the slide G ascends and descends it imparts a corresponding reciprocating movement to the slide J, the advance and retreat of both the slides I and J being simultaneous, so that in their advance their faces approach each other, and in their retreat they separate.

In the face of the two slides I J two dies, $m\ n$, are arranged. The one, $n$, at the right may present simply a flat face, in length substantially the length of the calk to be produced. In the other die, $m$, is a cavity, $o$, which from the front toward the rear corresponds to the size of the bar from which the calk is to be formed. At its inner end the die is provided with a projection, $r$, toward the face of the opposite die, and so that at the extreme inner end the space between the dies is reduced. At the extreme inner end of the cavity o of the die m the cavity is turned downward, as at s, (see Fig. 5,) corresponding in shape to the spur to be formed. At the outer end of the cavity, or upon the front side of the die m, the cutter t is arranged. The length of the cavity o from the cutter to its inner end is the length of the calk-blank to be produced, and the cavity corresponds to the shape of the finished calk.

The rod from which the calk is made is in dimensions corresponding to the size of the calk. One end is entered between the two dies m n, and as they approach each other they close upon the rod, the cutter t separating a portion sufficient for one calk. The projection r at the inner end of the cavity makes a corresponding depression in the calk, and throws out the metal to substantially the shape as seen in Fig. 6, and as seen in broken lines, Fig. 5.

In a plane parallel with the slides E G, and intermediate between them, is a third slide, K, arranged between guides u u, and to which reciprocating movement is imparted by an eccentric on the driving-shaft through a connecting-rod, L. The inner end of the dies m n is inclined corresponding to the inclination of the slide K, and as seen in Fig. 2. This slide K carries a die, M, which, in the movement of the slide K, passes close upon the inner end of the dies m n, and when in its elevated position it stands in substantially the relation to the dies m n seen in Fig. 5, and so that in its descent its front face works close upon the inner or rear face of the dies m n. The front face of the die M has at its lower end a V-shaped cavity, v. Immediately above that cavity a transverse cutter-like edge, w, is formed. (See Figs. 5 and 7.) After the dies m n have closed upon the blank and thrown out the metal, as seen in broken lines, Fig. 5, and while those dies remain stationary closed upon the blank, the slide K descends, carrying the die M down across the face of the two dies. The V-shaped cavity v in the die M strikes the projecting portion of metal on the blank forced outward by the closing of the dies m n and drives that metal downward into the cavity s. Then, still descending, the cutting-edge w trims whatever bur or fin may have been formed by the die M in forcing the metal downward into the part s of the cavity. Then the several dies separate, and the calk drops from the machine complete and ready for market, as seen in Fig. 8. The rod is moved forward for a second blank, the operation is repeated, and so continuing the calks are successively formed and delivered from the machine. A guide, N, is arranged to govern the relative position of the rod to the dies, and an adjustable stop, p, is provided, against which the inner end of the rod will strike to govern the length of the metal to be cut to form the blank.

I have represented the cavity o s and the projection r as formed in one die, m; but the cavity may be partly formed in the die n, if desired.

While I prefer to employ the cutter w above the cavity v in the die M to trim the fin or burr from the blank, the die M may run so perfectly with relation to the inner end of the dies m n as to cause the edges of the cavity v to prevent the formation of a burr or trim off the burr if it be formed.

I claim—

1. The combination of the two horizontal slides I J, carrying in their adjacent faces, respectively, the dies m n, the cavity in the said dies corresponding to the finished calk, one of said cavities constructed with a projection, r, toward the other die, the inner end of the dies inclined to the line of the cavity corresponding to the inclination required for the end of the calk, a slide, K, having a reciprocating movement at right angles to the path of movement of the slides carrying the said dies m n, and the die M on said slide K, constructed with a cavity, v, in its face, substantially as described.

2. The combination of the reciprocating horizontal slides I J, the dies m n, respectively, in said slides I J, the reciprocating slide K at right angles to the path of movement of said slides I J, the dies m n forming a cavity between them corresponding to the finished calk, and the die M on the slide K, constructed with a cavity, v, in its face and with a cutting-edge, w, above it, substantially as and for the purpose described.

3. The combination of the like vertically-reciprocating slides E G, constructed, respectively, with a slot, e l, one portion of said slots inclined to the path of movement of the slides, and the other portion parallel therewith, the slides I J, connected, respectively, with the slides E G through their respective slots e l, the dies m n, arranged, respectively, in the slides I J, and having a cavity between them corresponding to the shape of the finished calk, the reciprocating slide K, and die M on said slide K, constructed with the cavity v, substantially as and for the purpose described.

4. The combination of the like vertically-reciprocating slides E G, constructed, respectively, with a slot, e l, one portion of said slots inclined to the path of movement of the slides, and the other portion parallel therewith, the slides I J, connected, respectively, with the slides E G through their respective slots e l, the dies m n, arranged, respectively, in the slides I J, and having a cavity between them corresponding to the shape of the finished calk, the reciprocating slide K, die M on said slide K, constructed with the cavity v, and with the cutting-edge w above said cavity v, substantially as described.

5. The combination of the two horizontal slides I J, carrying in their adjacent faces, respectively, the dies m n, the cavity between the said dies corresponding to the finished calk, one of said cavities constructed with a projection, r, toward the other die, the inner ends of the dies inclined to the line of the cavity corresponding to the inclination required for the end of the calk, a slide, K, having a reciprocating movement at right angles to the path of movement of the slides carrying the said dies m n, the die M on said slide K, constructed with a cavity, v, in its face, and the cutter t, arranged in connection with one of said dies m n, and reciprocating therewith, substantially as described.

6. The combination of the reciprocating horizontal slides I J, the dies m n, respectively, in said slides I J, the reciprocating slide K at right angles to the path of movement of said slides I J, the dies m n forming a cavity between them corresponding to the finished calk, the die M on the slide K, constructed with a cavity, v, in its face, and with a cutting-edge, w, above it, the cutter t, arranged in connection with one of said dies m n, and reciprocating therewith, substantially as described.

7. The combination of the like vertically-reciprocating slides E G, constructed, respectively, with a slot, e l, one portion of said slots inclined to the path of movement of the slides, and the other portion parallel therewith, the slides I J, connected, respectively, with the slides E G through their respective slots e l, the dies m n, arranged, respectively, in the slides I J, and having a cavity between them corresponding to the shape of the finished calk, the reciprocating slide K, die M on said slide K, constructed with the cavity v, and the cutter t, arranged in connection with one of said dies m n, and reciprocating therewith, substantially as described.

8. The combination of the like vertically-reciprocating slides E G, constructed, respectively, with a slot, e l, one portion of said slots inclined to the path of movement of the slides, and the other portion parallel therewith, the slides I J, connected, respectively, with the slides E G through their respective slots e l, the dies m n, arranged, respectively, in the slides I J, and having a cavity between them corresponding to the shape of the finished calk, the reciprocating slide K, die M on said slide K, constructed with the cavity v, the cutting-edge w above said cavity v, and the cutter t, arranged in connection with one of said dies m n, and reciprocating therewith, substantially as described.

FRANK W. TUCKER.

Witnesses:
JOS. C. EARLE,
JOHN E. EARLE.